Dec. 20, 1966  R. G. HILL ETAL  3,292,495
TRACER SYSTEM FOR MACHINE TOOLS
Filed Oct. 14, 1965  8 Sheets-Sheet 1

INVENTORS
ROGER GETTYS HILL
GEORGE A HOFFMAN
BY
Darby + Darby
ATTORNEYS

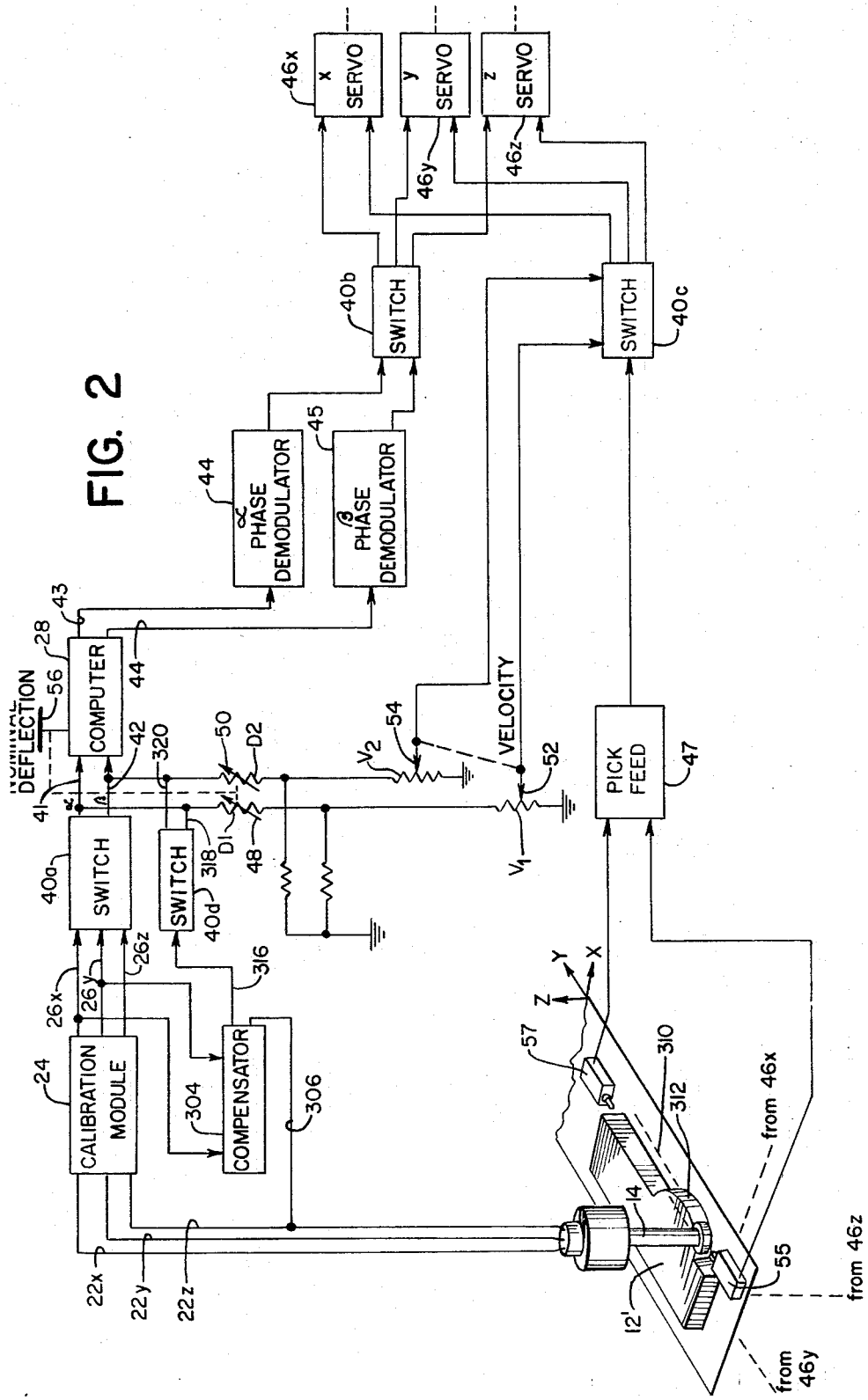

Dec. 20, 1966 R. G. HILL ETAL 3,292,495
TRACER SYSTEM FOR MACHINE TOOLS
Filed Oct. 14, 1965 8 Sheets-Sheet 4

INVENTORS
ROGER GETTYS HILL
GEORGE A. HOFFMAN
BY
Darby & Darby
ATTORNEYS

INVENTORS
ROGER GETTYS HILL
GEORGE A. HOFFMAN
BY
*Darby & Darby*
ATTORNEYS

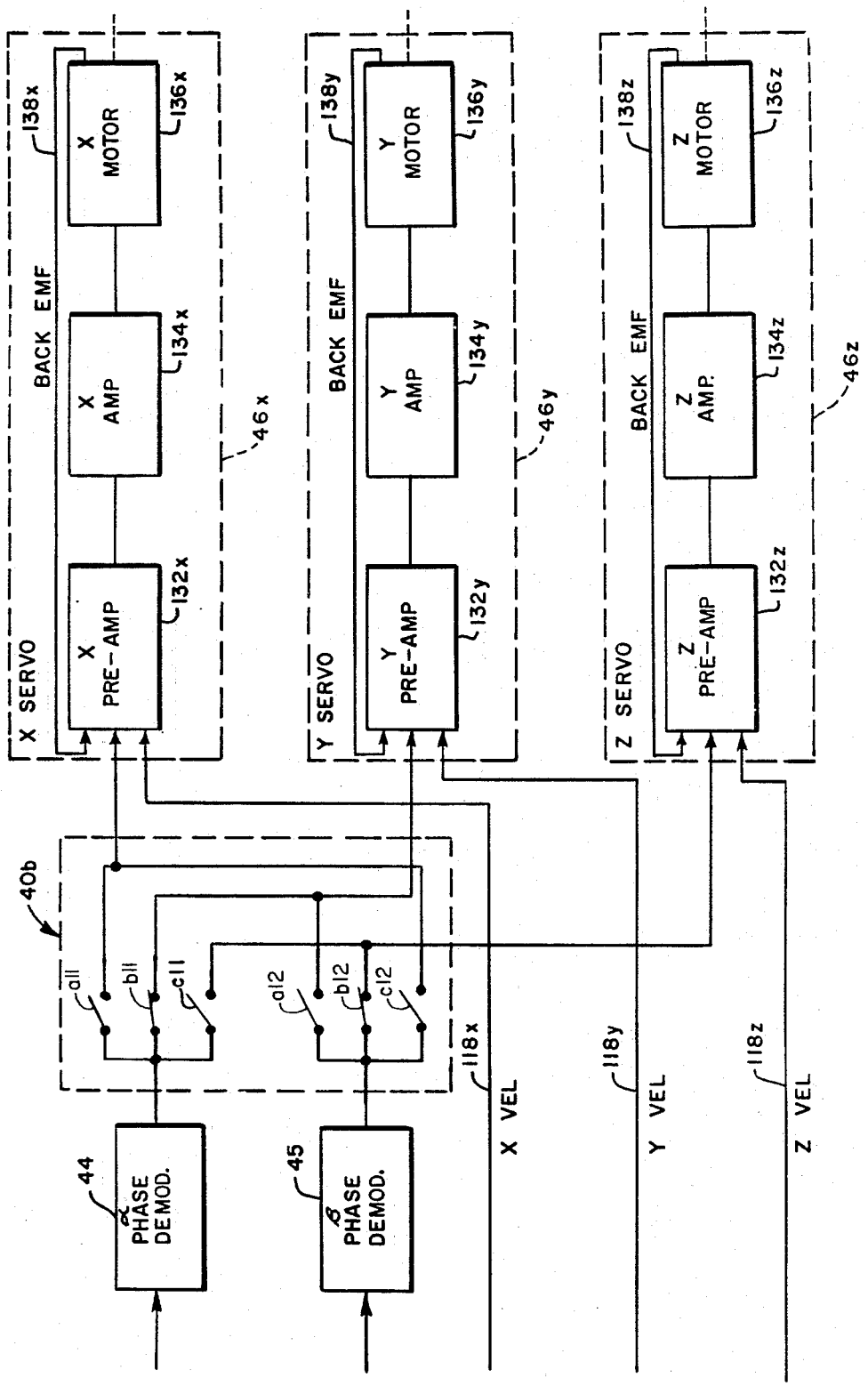

INVENTORS
ROGER GETTYS HILL
GEORGE A. HOFFMAN
BY
*Darby & Darby*
ATTORNEYS

Dec. 20, 1966 R. G. HILL ETAL 3,292,495
TRACER SYSTEM FOR MACHINE TOOLS
Filed Oct. 14, 1965 8 Sheets-Sheet 8

INVENTORS
ROGER GETTYS HILL
GEORGE A. HOFFMAN
BY
*Darley & Darley*
ATTORNEYS 3,292,495
TRACER SYSTEM FOR MACHINE TOOLS
Roger Gettys Hill and George A. Hoffman, Racine, Wis., assignors to Gettys Manufacturing Company, Incorporated, Racine, Wis., a corporation of Wisconsin
Filed Oct. 14, 1965, Ser. No. 495,890
28 Claims. (Cl. 90—13.5)

This is a continuation-in-part of application No. 463,280, filed June 11, 1965.

This invention relates to machine tools, and, in particular, to a tracing system for use with automatic machine tools.

Fundamentally, two different techniques are used to automatically control the operation of machine tools such as milling machines, saws, and the like. One involves digital techniques whereby a programmed tape or the like is used to position the tool. The second, and older of the two, is a tracing operation wherein movement of a tracing stylus with respect to a template provides electrical control signals which are used to position the work piece with respect to the tool. Each system has certain advantages and the present invention relates to a tracer system which, in general, is less expensive and less complex than a digital system, and provides a superior finish in the case of a milling head or the like, since, necessarily, machine movement in a digital system is incremental.

In the tracer art a number of different techniques have evolved. In a basic single axis tracing system the template is moved with respect to the tracer head along a feed axis at a constant rate of speed. The error signal produced by deflection of the tracer stylus is used to position the template with respect to the stylus (and thus the work piece with respect to the tool) along a tracer axis transverse to the feed axis. The major disadvantage of a single axis tracing system is that the constant movement along the feed axis requires the generation of an infinite error signal to trace a path parallel to the tracer axis. Furthermore, the relative velocity between the template and tracer stylus is a function of the error signal, and a change in velocity is detrimental to the finish of the work piece.

A modification of the single axis tracing system, known as single axis with slow down or 180° tracing, includes a provision for automatically slowing or stopping movement along the feed axis depending upon the generated error signal. In a known fashion, this enables the machine to trace a path parallel to the tracer axis while reducing the error inherent in the system. As its name implies, any 180 degree tracing system is only capable of tracing a maximum excrusion of 180 degrees because of the inability of the device to reverse movement along the feed axis.

The latter drawback has been overcome by the development of 360 degree systems which controls movement of the template with respect to the tracer stylus along both the feed and tracer axes thereby permitting tracing of a continuous path. In addition, because a 360 degree system provides control along both axes, such systems need include no inherent position error, and in theory, can trace at a constant velocity with respect to the template. The latter feature is important since it provides an improved finish on the completed work piece. The former provides the known advantages of servos operating around their nulls.

The most advanced forms of 360 degrees tracing systems utilize tracer heads which produce output voltages proportional in amplitude to the stylus deflection along the feed and tracer axes, which for the present purposes, may be considered the Y and X axes. The Y and X deflection voltages are in phase and one of the two is shifted ninety degrees and then combined with the other to form an alternating voltage having an amplitude proportional to the magnitude of stylus deflection and a phase proportional to the direction in which such deflection occurs.

The deflection of the stylus will always be perpendicular to the template, and since it is desired to move the stylus tangentially with respect to the template surface, the velocity vector must always be perpendicular to the direction of deflection. To compute these directions, it is necessary that there always be some slight initial stylus deflection (hereinafter "nominal deflection"). In fact, since the position error desirably is zero, in theory the stylus deflection should not exceed the preselected nominal deflection. Once the phase of the nominal deflection signal is known, the direction of the velocity signal may be calculated by shifting the nominal deflection signal ninety degrees. The required amplitude of the velocity signal may be achieved by increasing the level of the voltage signal by a selected amount.

Since the ideal position error is minimum, it is necessary to also position the template with respect to the stylus so that the stylus deflection returns to its nominal value. This requires relative movement between the stylus and template opposite that of the deflection error signal, and hence the necessary control signal for this purpose is derived by reversing the phase of the position error voltage. In the prior art, the position error and velocity signals are combined to produce a resultant voltage having an amplitude and phase proportional to the magnitude and direction in which relative movement must occur. By phase demodulating this resultant voltage the necessary X and Y servo control voltages are derived whereby the template is positioned with respect to the stylus so that the position error returns to zero while the velocity vector remains constant in a direction tangential to the template.

In theory, the prior art devices described above provide the desired result. However, since the velocity signal is much greater than the position error (which desirably is zero), the control circuits in one of the channels must sometimes reject very large velocity signals while responding to low amplitude position error signals. In practice this is difficult, and the failure of prior art devices to suitably reject the undesired velocity voltages has resulted in decreased accuracy.

Accordingly, the main object of the present invention is to provide a tracer system which overcomes this drawback.

A further object of the invention is to provide a fully automatic tracer capable of tracing in three dimensions.

Another object of the invention is to provide a tracer head for use in a tracing system wherein the position error is substantially zero and wherein the nominal deflection of the stylus is extremely low and variable over a relatively wide range.

Still another object of the invention is to provide a tracer head capable of providing signals proportional to the stylus deflection along three mutually perpendicular axes.

It is yet another object of the invention to provide a fully automatic three dimensional tracing system wherein the stylus may be stepped with respect to the template along any one of three mutually perpendicular axes.

Briefly, the above objects of the invention are accomplished by computing only the position error signals in the computer, and deriving the velocity signals directly from the outputs of the transducers. Thus, considering the X, Y plane, the velocity signals for the Y servo are coupled directly from the X transducer while the velocity signals for the X servo are coupled directly from the Y transducer.

The invention provides automatic three dimensional tracing by tracing in two dimensions, and then incrementally stepping the stylus with respect to the template along the third axis after each tracing pass. The tracing operation then recommences in the reverse direction back across the template until the entire template has been scanned. The two dimensional tracing may proceed with the velocity signals derived directly from the respective transducers as mentioned above, and switch means are provided so that any two axes may be selected for the tracing operation with the third axis automatically becoming the pick feed axis.

The transducer signals for the two dimensional tracing operation may be derived in accordance with conventional techniques. However, according to a further feature of the invention a three dimensional head is provided which is capable of producing alternating signals which vary in amplitude as functions of stylus deflection along each axis. In accordance with this feature of the invention, the vertical or Z axis transducer comprises a unique spring mounted stylus holder which biases a magnetic core to a neutral position within a vertical transducer coil, and which may be readily combined with the structure of a conventional two dimensional tracing head so that all three required transducer signals can be derived from a single head.

If a single stylus head is used to produce all three deflection signals (i.e., X, Y and Z), errors may be introduced into the nominal deflection signal when tracing a surface which is sharply skewed with respect to the pick feed axis. Therefore, in accordance with another feature of the invention, means are provided to compensate for stylus deflection along the pick feed axis by causing the pick feed deffection to appear as stylus deflection along one of the tracing axes. Means are also provided to prevent the compensated signal from causing a regenerative error which would produce overdeflection of the stylus under certain tracing conditions.

The manner in which the above and other objects of the invention are accomplished is described more fully below with reference to the attached drawings, wherein:

FIGURE 2 is a block diagram of a fully automatic three dimensional tracing system also incorporating the principles of FIGURE 1;

Figure 4:
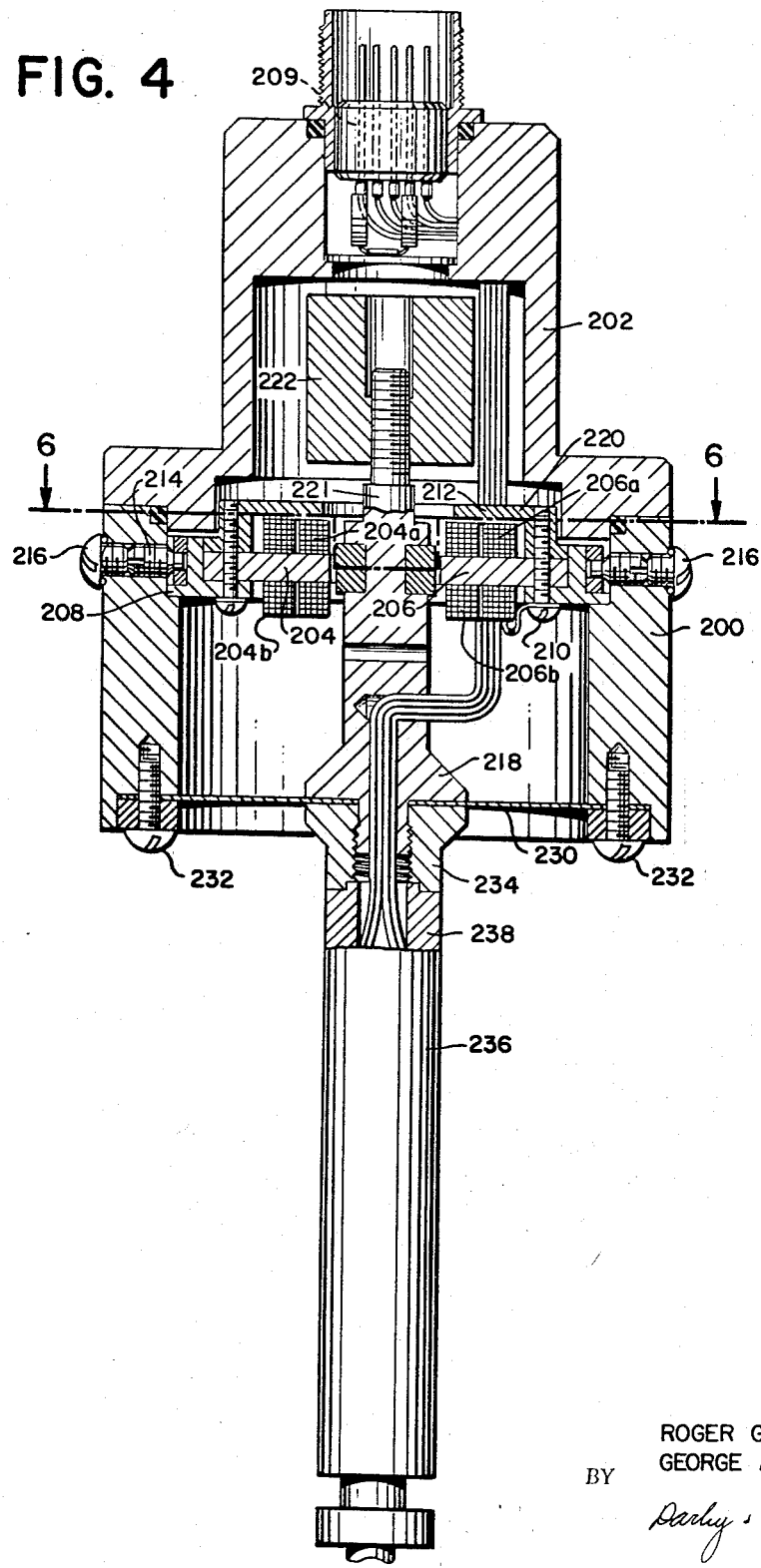
Figure 6:
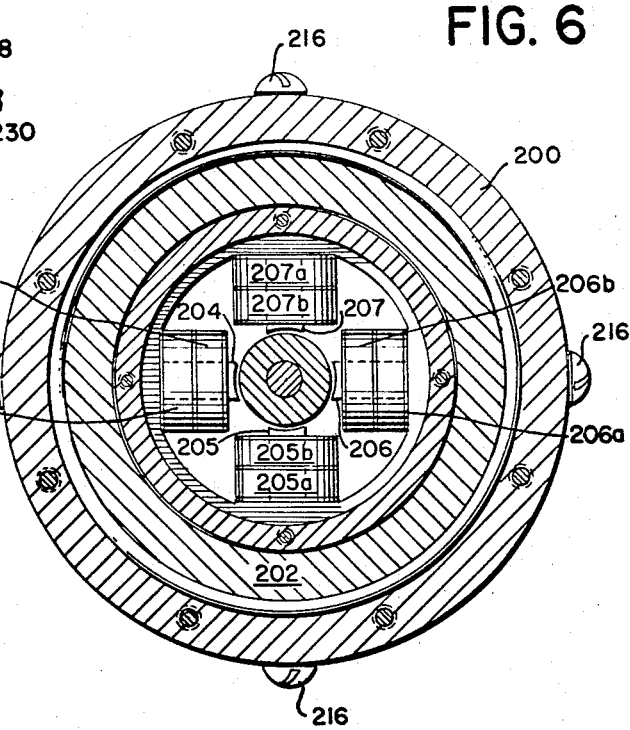
Figure 5:
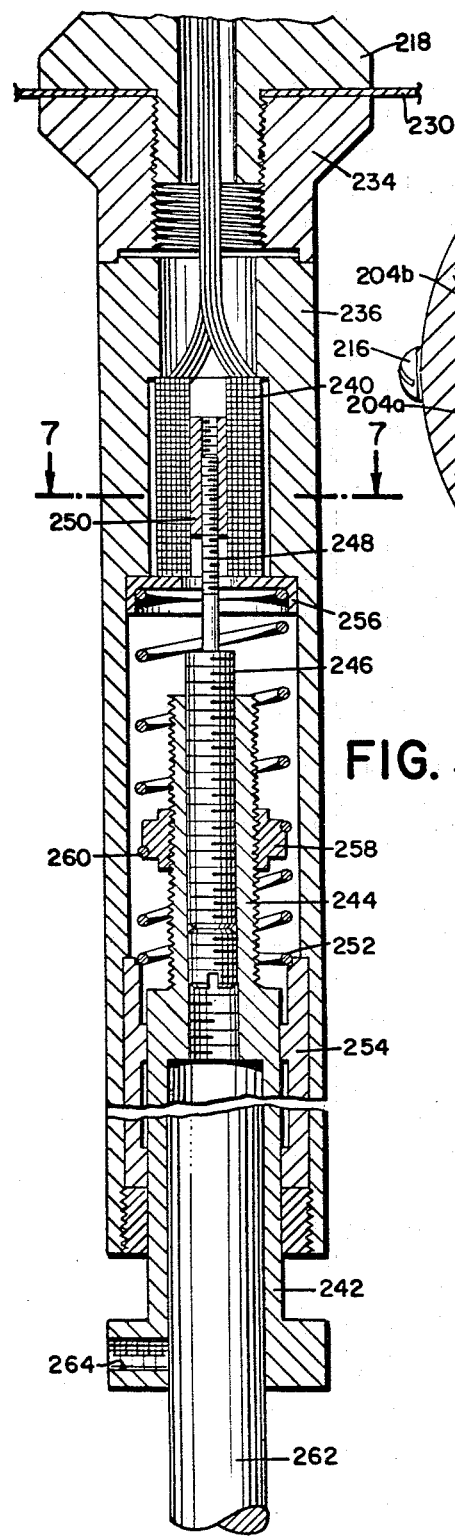

FIGURES 3A, 3B, 3C, 3D and 3E comprises a circuit diagram in partial schematic form of the three dimensional system of FIGURE 2;

FIGURE 4 is a side view, partially in section, of a three dimensional tracing head according to the invention;

FIGURE 5 is a side sectional view showing the details of the novel Z axis transducer means of the tracing head of FIGURE 2;

FIGURE 6 is a cross sectional view along the line 6—6 of FIGURE 4; and

Figure 7:
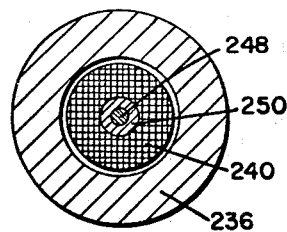

FIGURE 7 is a cross sectional view along the line 7—7 of Figure 5.

Figure 1B:
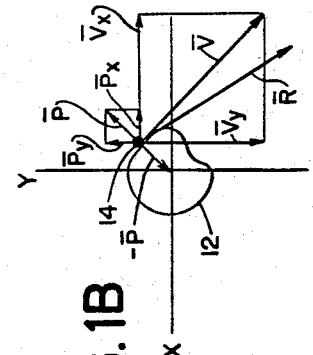
FIGURE 1B is a vector diagram used for explanatory purposes.
Figure 1A:
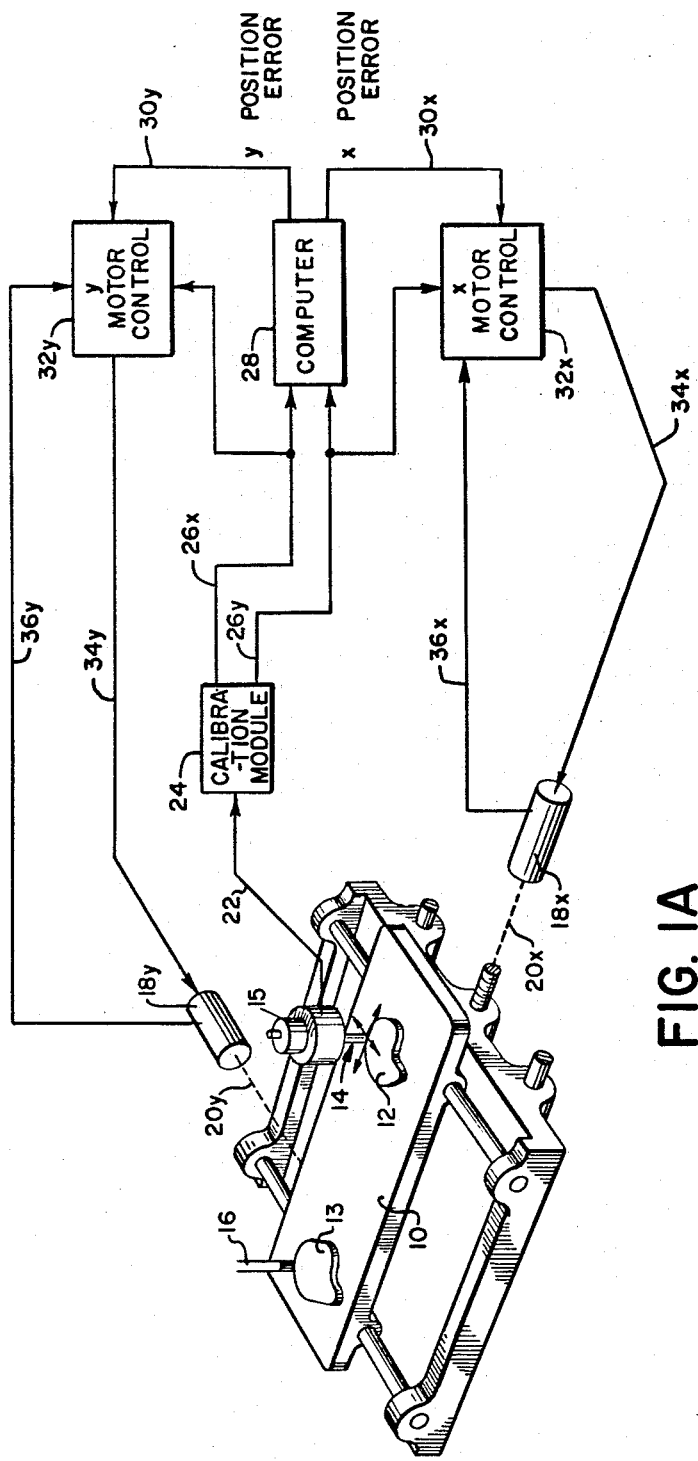
FIGURE 1A is a block diagram showing the application of certain principles of the invention to a two dimensional tracing system.

Referring to FIGURE 1A, the principles of the invention are illustrated in block diagram form as applied to a two dimensional tracing system. A machine table is shown schematically at 10 with a master or template 12 and the work piece 13 situated thereon. A tracer stylus 14 mounted in a head 15 cooperates with template 12 and produces the control signals which cause tool 16 to operate on workpiece 13 to form a product identical to template 12.

Relative movement between tracer stylus 14 and template 12 is provided by reversible motors 18$x$ and 18$y$ which, through schematically illustrated lead screws 20$x$ and 20$y$, position the table 10 along X and Y axes. In the following specification the letters $x$ and $y$ are used to designate components which are associated with the respective axes.

The present invention relates to the apparatus for positioning the workpiece with respect to the tool and is not dependent in any way upon the actual machine tool used. For this reason, the machine tool, motors, lead screws, etc., are illustrated only in schematic form. Moreover, it will be apparent that even the schematically illustrated construction is not necessary to practice the invention. For example, table 10 could be moved along one axis and the stylus 14 and cutting tool 16 along the second axis, or, the stylus and tool alone could be moved along both axes. The invention would have equal utility with a system in which the table is rotated with respect to the stylus and linear motion occurs radially of the table, i.e., polar coordinate tracing. The only requisite is that relative movement between stylus 14 and template 12 control the relative movement between workpiece 13 and tool 16. Conventionally, the tool and tracer head 15 are stationary with respect to earth.

The tracer head 15 produces output signals on cable 22 which are representative of the deflection of the stylus 14 along both the Y and X axes. These signals are fed through a calibration module 24 to appear on lines 26$x$ and 26$y$. The voltages on lines 26$x$ and 26$y$ are alternating voltages which are in phase, the respective magnitude being proportional to the deflection of the stylus by the template along the associated axes. Ideally the vector sum of these voltages (when properly phase shifted) represents the nominal deflection.

These signals are then fed to a computer 28 which, as explained below, produces on line 30$y$ a direct voltage (for example) proportional to the position error of stylus 14 with respect to the Y axis, and a direct voltage on line 30$x$ proportional to the position error of stylus 14 along the X axis. Lines 30$x$ and 30$y$ are fed as one input to respective motor control units 32$x$ and 32$y$.

In the prior art, as explained above, a resultant vector was derived by the computer and the Y and X components thereof subsequently used to control the respective motors. In the present case, the computer 28 calculates the position error along the Y and X axes while the velocity control signals are derived directly from the calibration module 24. As illustrated, the X position signal on line 26$x$ provides the velocity input to the Y motor control unit 32$y$ and the Y position signal on line 26$y$ provides the velocity input to the X motor control unit 32$x$.

The motor control units 32$x$ and 32$y$ operate the respective motors 18$x$ and 18$y$ via lines 34$x$ and 34$y$ with feedback lines 36$x$ and 36$y$ providing the required references for operating the motors.

The theory of operation is further explained with reference to the vector diagram of FIGURE 1B. In FIGURE 1B the X and Y axes are as illustrated with the template 12 and stylus 14 shown in a representative position. The deflection of the stylus 14 is shown by a vector $\overline{P}$ which extends in a direction normal to the template surface contacting stylus 14. It is desired that the velocity of stylus 14 with respect to template 10 be tangential to the template surface at a constant magnitude as shown by $\overline{V}$. It is further desirable, for reasons well known in the servo arts, to operate around the null points of the servos, which requires reduction of $\overline{P}$ to zero. It is therefore necessary that the servos position stylus 14 with respect to template 12 as shown by the vector $-\overline{P}$.

Before proceeding further with the explanation, it should be noted that the present discussion is for explanatory purposes only and is not intended in any respect to indicate the voltages which will actually exist in the system. In many respects the present discussion is oversimplified, but should aid in an understanding of the present invention.

Both the prior art and the invention move the stylus with respect to the template in accordance with the information contained in the voltages represented by $\overline{V}$ and $-\overline{P}$. The prior art computed the required control voltages for the X and Y servos by combining $\overline{V}$ and $-\overline{P}$ into a resultant vector $\overline{R}$. The resultant X and Y components of $\overline{R}$ (not shown) were derived from a phase detecting device and these component voltages used to drive the servos. As noted above, such prior art devices experienced considerable difficulty in deriving the required control signals because of the actual disparity in amplitude between voltages $\overline{V}$ and $-\overline{P}$.

The present invention avoids these difficulties, in effect, by using the component voltages of the nominal deflection as they come directly from the tracing head to derive the velocity control. Thus, the required velocity vector $\overline{V}$ may be thought of as being composed of two vectors, $\overline{V}x$ and $\overline{V}y$. If the magnitude of $\overline{V}x$ is proportional to the magnitude of $\overline{P}y$, and the magnitude of $\overline{V}y$ is proportional to the magnitude of $\overline{P}x$, it is clear that $\overline{V}$ will be precisely perpendicular to $\overline{P}$. If the magnitude of $\overline{P}$ remains constant, the magnitude of $\overline{V}$ will remain constant. Therefore, by taking a voltage proportional to $\overline{P}x$, and applying it to 32y, and a voltage proportional $\overline{P}y$ and applying it to 32x, a template velocity is created which is constant in magnitude and tangent to that portion of the template surface in contact with the stylus. Simultaneously, the Y position error and X position error signals (should there be any) on lines 30y and 30x, respectively, produce the required null producing signal to position the stylus so that the position error voltage tends to zero.

FIGURE 2 is a block diagram showing the application of the above and other novel principles to a three dimensional tracing system. Wherever possible the identifying numerals of FIGURE 1A are used to designate the identical component in FIGURE 2. The three axes are designated as X, Y, and Z axes, and those elements of the system which operate along only one of the axes are designated by the use of a corresponding lower case $x$, $y$, or $z$ adjacent the identifying numeral. It is again assumed that the tool and tracer head remain stationary with respect to earth, the table supporting the workpiece and template being movable along all three axes.

The outputs of the head 15 are coupled via lines 22x, 22y, and 22z to the calibration module 24. Each of the inputs to module 24 is an alternating voltage having an amplitude proportional to the deflection of the stylus with respect to a three dimensional master 12' along the associated axis. The calibration module 24, as explained in detail below, removes certain undesirable voltages from each of the control signals and these three signals are then fed to a routing switch 40a.

In the preferred embodiment of the invention, the three dimensional tracing is accomplished by tracing along two axes (hereinafter the $\alpha$ and $\beta$ axes) in the manner explained with reference to FIGURE 1A, stepping the stylus with respect to the template along the other axis (hereinafter the pick feed axis) after each tracing operation, and then retracing along the $\alpha$ and $\beta$ axes in the reverse direction. In this fashion, the tracing stylus scans back and forth over the three dimensional master 12' until the entire volume has been covered. The operator can manually select any two axes for the two dimensional tracing with the third axis automatically being used as the pick feed axis. For this purpose four switches 40a, 40b, 40c, and 40d are schematically illustrated in FIGURE 2, with the contacts of the four switches being simultaneously operated to appropriately route the respective control signals.

Switch 40a has two outputs 41 and 42 which are coupled to a computer 28 and on which appear the voltages corresponding to the stylus deflection along the selected $\alpha$ and $\beta$ axes. In other words, if it were desired to trace along the X, Y axes the signals on line 41 and 42 would correspond to the control voltages on line 26x and 26y, respectively. The voltages on lines 41 and 42 are vectorially combined by computer 28 which produces on output lines 43 and 44 respective voltages having amplitudes and phases representative of the component of stylus deflection along the $\alpha$ and $\beta$ tracer axes. Lines 43 and 44 are coupled to respective $\alpha$ and $\beta$ phase demodulators 44 and 45, the outputs of which are representative of the position errors along the selected $\alpha$ and $\beta$ axes. In accordance with well known principles, such outputs may be direct voltages which are then coupled to the X and Y servos 46x and 46y, respectively, through switch 40b. Switch 40b serves to retranslate the selected $\alpha$ and $\beta$ axes into the requisite X, Y, and Z coordinates. Hence, with $\alpha$ and $\beta$ corresponding to the X and Y axes, respectively, the outputs of phase demodulators 44 and 45 are coupled to servos 46x and 46y, respectively.

The velocity signals are derived directly from the output of switch 40a through deflection pots D1, D2 and velocity pots V1, V2. The slide wires 52 and 54 of the velocity pots are also coupled through switch 40c to the proper servos so that the $\alpha$ velocity signal drives the servo controlled by the $\beta$ position error and vice versa. Switch 40c also routes appropriately timed signals from a pick feed generator 47 to the third servo to provide the three dimensional tracing.

By way of example, if it is desired to trace in the X, Y plane (i.e., $\alpha$ and $\beta$ correspond to the X and Y axes), switches 40a, 40b, and 40c operate so that the pick feed generator 47 is coupled to servo 46z; the X position error is coupled to servo 46y and the Y position error is coupled to servo 46x to provide the required velocity signals. The position error control for the servos 46x and 46y are derived from the $\alpha$ and $\beta$ phase demodulators 44 and 45, respectively. When a tracing operation has been completed in one plane, limit switches 55 or 57, suitably positioned, are actuated causing the pick feed 47 to step the stylus along the pick feed axis and reinitiating the tracing operation in the $\alpha$ and $\beta$ axes but in the reverse direction. This control is explained in greater detail below.

To this point, the explanation has proceeded under the theoretical assumption that for a zero position error there is no stylus deflection. In reality, and as mentioned previously, it is necessary that there be some nominal deflection of the stylus with respect to the template to initiate the circuit operation and provide the basic information. The nominal deflection therefore is an important parameter and, for reasons well known in the art, is desirably low and variable over a relatively wide range. The present invention includes means (not shown in FIGURE 2) for indicating the stylus deflection and controls on the panel permitting the operator to vary the deflection over a wide range. Such adjusting means are shown schematically at 56 which sets the computer 28 depending upon the desired nominal deflection.

When system operation is to be initiated, the template 12' is manually skewed with respect to the stylus 14. As the stylus 14 is deflected, voltages appear along the selected $\alpha$ and $\beta$ tracer axes which are coupled to lines 41 and 42. When these voltages reach a pre-determined level which is dependent upon the selected nominal deflection, the system operation commences as described above.

Because the velocity inputs to the selected servos 46x, 46y and 46z are derived directly from the $\alpha$ and $\beta$ lines 41 and 42, it is necessary that the voltages on lines 41 and 42 can be increased or attenuated in accordance with the nominal deflection selected. If this were not the case, a change in nominal deflection would also cause a change in velocity, which is undesirable. Hence, for this purpose the adjusting means 56 is mechanically linked to the slide wires 48 and 50 of deflection pots D1 and D2, respectively.

These pots are appropriately calibrated so that when the nominal deflection of the system is increased the voltages across the velocity pots V1 and V2 remain substantially constant despite the increased voltage on line 41 and 42.

To change the magnitude of the velocity vector, it is merely necessary to vary the position of slidewires 52 and 54, which are mechanically coupled together, thereby varying the level of the voltage coupled to the respective servos 46x, 46y, and 46z.

When tracing in three dimensions, it is not possible to ignore stylus deflection along the pick feed axis because the nominally deflected position of the stylus represents the analog of the tool position. If the stylus position varies from its nominal deflection, the tool will remove more material than it should, and nominal deflection in the present case is a combination of stylus deflection along the X, Y, and Z axes. Therefore it is this combined total which should be maintained constant.

Figure 2A:
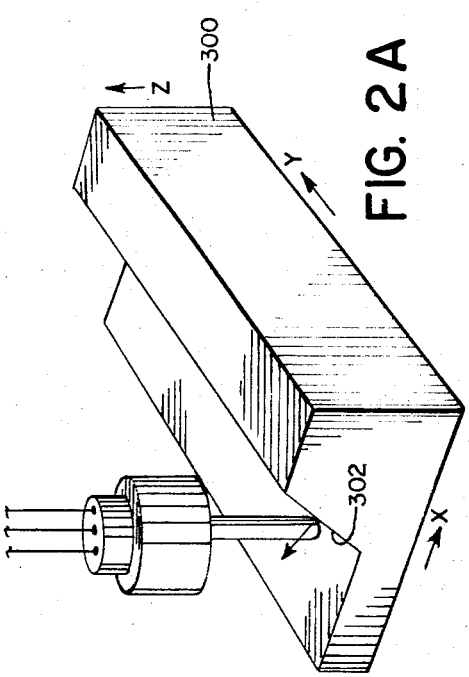
FIGURE 2A is a diagram used for explanatory purposes.

In the system so far described with reference to FIGURE 2, situations can arise where this nominal deflection requirement cannot be achieved. For example, referring to FIGURE 2A, a three dimensional template 300 is illustrated having a sharply skewed surface 302. Assume that tracing is occurring in the YZ plane. With the stylus 14 in the position shown on the skewed surface 302 there is a considerable component of stylus deflection along the X axis. As surface 302 is parallel to the Y axis, there is no stylus deflection with respect to the Y axis; hence the required nominal deflection must be obtained along the Z axis. However, if the template 300 were moved upwardly to achieve the nominal deflection in the Z direction, it would simultaneously create considerable deflection in the X direction. For example, if a desired Z deflection of ten thousandths of an inch were desired, possibly fifteen thousandths of an inch deflection in the X direction would be produced. This is objectionable because the nominal deflection normal to the surface 302 should be equal to ten thousandths of an inch, while in fact it would be far in excess of this figure.

To avoid this drawback, a circuit identified as compensator 304 in FIGURE 2 is coupled to the output lines 26x and 26y at the output of the calibration module 24. Compensator 304 selects one of the two inputs which corresponds to the selected pick feed axis. In the present example, when tracing in the YZ plane, the compensator 304 would examine the deflection signal present on line 26x and produce on an output line 306 a signal related to the magnitude of such deflection regardless of its direction. Line 306 is coupled back to the stylus output line 22z where it is added to the actual Z axis deflection. Thus, the deflection along the pick feed axis appears as deflection along the Z axis whereby the desired nominal deflection perpendicular to the template is achieved.

There are also some instances wherein the combination of the pick feed deflection and the Z axis deflection would produce a regenerative error which would inhibit system operation. For example, referring to the template 12' specifically illustrated in FIGURE 2, assume that the stylus 14 is to trace in the YZ plane along the path indicated by dashed line 310. Template 12' includes a sizable bulge 312, and when stylus 14 reaches the bulge, the stylus will experience a considerable deflection in the X direction. When this X deflection is translated as a Z axis deflection, the result will be to increase the Y velocity signal as previously explained. However, an increase in Y velocity will result in further X deflection, which (when translated as a Z deflection) results in further Y velocity. This regenerative system would eventually produce an overdeflection voltage as explained below with reference to the circuit diagram of FIGURES 3A–3E, which would inhibit system operation.

To avoid this particular drawback, compensator 304 produces a slow-down signal on line 316 which is coupled to a fourth switching circuit 40d. Switch 40d routes the slowdown signal on line 316 via either of lines 318 or 320 to respective velocity potentiometers V1 or V2, causing (in the present example) slowdown or stoppage of the template movement in the Y direction until this excess X deflection has been reduced.

FIGURES 3A, 3B, 3C, 3D and 3E comprise a detailed block diagram, partially in schematic form, of the embodiment of the invention illustrated in FIGURE 2. Where possible, the same numerals are used to identify those elements which are not changed, with the "blocks" of FIGURE 2 defined by dotted lines.

Figure 3A:
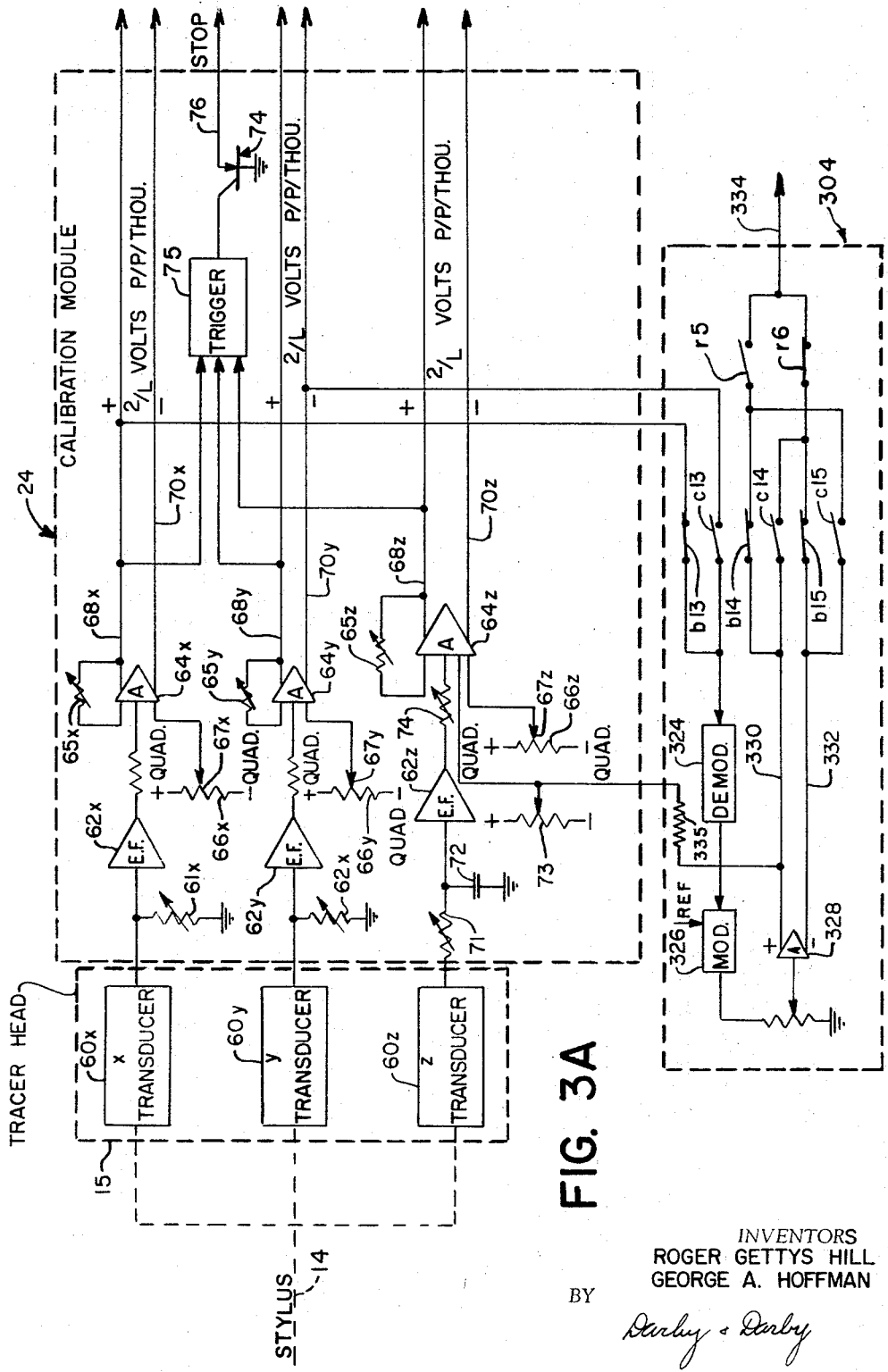

FIGURE 3A illustrates the calibration module shown at 24 in FIGURE 2. The basic purpose of the calibration module is to remove quadrature voltages appearing in the transducer outputs from head 15 due to the distributed capacitance of the respective transducer coils, which are illustrated in FIGURES 4–7. Since the invention requires a shift in phase of one of the transducer output voltages by ninety degrees, and subsequent combination thereof with a reference phase, the appearance of such quadrature voltages will introduce errors into subsequent points of the circuit unless they are removed.

In FIGURES 3A, X, Y, and Z transducers 60x, 60y and 60z, respectively, are schematically illustrated as mechanically coupled to the stylus 14. The output of each of the transducers is an alternating voltage having an amplitude proportional to the stylus deflection along the corresponding axis. In theory, all three transducer outputs are in phase, but, as mentioned above, in practice there will be a slight amount of quadrature voltage in each instance. By way of example, the frequency of the transducer voltage may be 1000 c.p.s., produced in accordance with conventional practice.

Since the calibration module circuits in each of the three channels are substantially identical, the operation of the X channel alone is described, it being understood that the identically numbered elements in the Y and Z channels operate in the same fashion. The special elements of the Z channel are specifically described.

There are a number of places in the drawings in which positive and negative signs appear although the circuit employs alternating voltages. These signs are used to indicate phase, a plus sign being indicative of the phase of an arbitrary reference voltage and the negative sign indicative of a voltage at the same frequency displaced one hundred eighty degrees in phase. Ideally, the outputs of the transducers 60x, 60y and 60z should be in phase with the reference.

The alternating voltage on the output of transducer 60x is taken across a variable resistor 61x and fed through an emitter follower 62x to a summing amplifier 64x. Amplifier 64x includes a variable feedback resistor 65x and a quadrature voltage divider 66x across which appears an alternating voltage at the same frequency as the output of transducer 60x but displaced in phase by ninety degrees by any conventional phase shifting circuit.

The purpose of the voltage divider 66x is to cancel any quadrature voltage appearing on the output line of transducer 60x. Thus, at the time of manufacture, the slide-wire 67x is adjusted so that when the output of the emitter follower 62x is summed with the quadrature voltage across voltage divider 66x, the undesired quadrature voltage is completely cancelled. The variable resistor 61x is similarly adjusted to insure that the output of transducer 60x is exactly in phase with the selected reference. In practice, there is some slight phase deviation in the transducer output from the reference which can be accounted for by a change in resistance value of the circuit.

The feedback resistor 65x sets the amplitude of the output voltage appearing on line 68x and 70x at a particular level for a given deflection. By way of example, the magnitude of the output voltage appearing on lines 68x and 70x may be made equal to 2/L volts peak-to-peak per thousandth of an inch stylus deflection along the X axis, where L is equal to the length of the stylus. With the voltage divider 66x and resistor 61x properly set, the output will be exactly in phas with the one thousand cycle reference and include no quadrature components.

The principle of operation of the Z channel is substantially the same as that described above, but there are slight differences since the transducer 60z (in the preferred embodiment) operates in a different manner from that of transducers 60x and 60y. For this reason, a variable resistor 71 is placed in series with the emitter follower 62z and a capacitor 72 connected across the input to the ground. The circuit, however, accomplishes the same function in that adjustment of resistor 71 is used to ensure that the input to the emitter follower 62z is precisely in phase with the thousand cycle reference.

The quadrature voltage is removed in the same fashion as described above, but a second voltage divider 73 is used to provide a Z axis null. This is necessary since, as explained below, the force of gravity has an effect on the Z axis transducer and when a particular stylus is inserted into the tracing head, it is necessary to adjust voltage divider 73 so that the output of amplifier 64z is zero when the stylus is not deflected by the template. The Z axis null potentiometer 73 is located on the front of the control panel to facilitate adjustment during actual use.

A variable resistor 74, also accessible from the front of the control panel, is used to accommodate different length styli. Resistor 74 changes the gain of amplifier 64z so that the output on lines 68z and 70z remains equal to 2/L volts peak-to-peak per thousandths of an inch deflection regardless of the stylus length. As will become more apparent below, the outputs of the transducers 60x and 60y are directly related to the length of the stylus L, while the output of transducer 60z is independent of stylus length. Hence, by increasing the value of resistance 74 for increased stylus length, the voltage output from transducer 60z can be maintained in the same proportion as the outputs of transducer 60x and 60y.

As a safety feature, a trigger circuit 72 has inputs coupled to lines 68x, 68y and 68z so that when either of the signals on these three lines exceeds a predetermined magnitude, an output pulse fires a silicon controlled rectifier 74 to produce an overdeflection signal on line 76 which, in an obvious manner, can be used to half operation of the system.

In application No. 463,280 the switches 40a, 40b and 40c are shown as twelve ganged switches S1–S12 having positions "a," "b," and "c" for selecting, respectively, the XY, YZ, and XZ axes for tracing. Because of the number of switches required, it is now preferred to use an equivalent relay switching arrangement which therefore is illustrated in the present circuit diagram. The relays are identified as relays A, B and C, and their corresponding contacts respectively labelled a, b and c with a subsequent numeral. As shown in FIG. 3E, one of relays A, B and C may be energized by manually positioning a switch armature S at respective stationary terminals a, b and c to select the desired tracing mode.

For purposes of explanation a specific example is carried through the circuit wherein tracing occurs in the YZ plane and the pick feed along the X axis, i.e. armature S is placed at terminal b to energize relay B. For this reason all of the contacts of relay B are shown in their actuated states with the contacts of relays A and C shown in their released or non-actuated states. The numbered lines in FIGURES 3B and 3C correspond to the identically numbered lines of FIGURE 3A with the phase relationship the same as that explained above.

In its illustrated condition, the thousand cycle transducer voltage on line 68z (FIG. 3B) is coupled through armature b3 and a ninety degree phase delay RC network 80 to one input of a summing amplifier 84. The other input to amplified 84 is derived from line 68y via armature b4 and a voltage divider 82.

The effect of the ninety degree phase delay network 80 is to shift the $\alpha$ transducer signal from 60z so that its phase corresponds to the direction of deflection along the $\alpha$ axis (assuming the phase reference to be along the $\beta$ axis). Hence, at the input to amplifier 84 there are two voltages having respective amplitudes and phases corresponding to the magnitude and direction of the stylus deflection along the selected $\alpha$ and $\beta$ axes. To aid in the explanation, vector representations of the voltages appearing at different points in the computer 28 are illustrated. These vectors do not represent voltages which would normally appear in practice, but taken with the following description may facilitate an understanding of the device.

When the two inputs to amplifier 84 are summed, the resultant voltage has an amplitude proportional to the stylus deflection in the $\alpha$, $\beta$ (here Z, Y) plane and a phase corresponding to the direction in which such deflection occurs. This deflection voltage appears on line 85, with a voltage one hundred eighty degrees out of phase with the deflection voltage and equal in amplitude appearing on line 86. The voltage on line 86 is fed through a conventional limiter 88 which limits the alternating voltage at its input to set the nominal deflection as explained more fully below. The voltage on line 86 is also coupled to a deflection meter 90 through amplifier 92 and adjustable voltage divider 94. An adjustable feedback resistor 93 is used to calibrate deflection meter 90. Hence, the meter by measuring the voltage level appearing on line 86 provides a visual indication to the operator of the extent to which the stylus has been deflected. The meter may be calibrated in units representing thousandths of an inch deflection. If it is desired to change stylus length, voltage divider 94 is adjusted accordingly so that the reading of meter 90 remains proportional to deflection.

The limiter 88 determines the nominal deflection, which must always be present, and its output will approximate a square wave because of the limiting action. Hence, the limiter voltage is coupled through a filter circuit 96 including an LC circuit 98 tuned to the reference frequency of one thousand c.p.s. so that the output of amplifier 96 is again a perfect sine wave.

A summing amplifier 100 combines the outputs of filter 96 and the deflection voltage appearing on line 85, the latter having been attenuated by a third deflection pot D3 and a current limiting resistor 102. A fourth deflection pot D4 is in the feedback circuit of summing amplifier 100. Deflection pots D3 and D4 are ganged with the deflection pots D1 and D2 described above with reference to FIGURE 2. Pot D3 produces the actual change in nominal deflection while pots D1, D2, and D4 compensate for changes in the nominal deflection where the appearance of this change would be deterimental.

The output of filter 96 and the voltage on line 85 are one hundred eighty degrees out of phase, therefore the summing amplifier 100 subtracts the nominal deflection, determined by limiter 88, from the actual deflection appearing on line 85. Since it is the extent to which the actual deflection exceeds the nominal deflection that controls the circuit operation, the critical intelligence appears on line 103 and 104 having the phase relationship illustrated.

The outputs of the transducers 60x, 60y and 60z are independent of the selected nominal deflection. If it is desired to change the nominal deflection (for tracing purposes) it is necessary to appropriately control the inputs to summing amplifier 100 so that its output remains representative of the actual error signal. Thus, pots D3 and D4 are used to "dial in" the desired deflection by suitably controlling the input voltages coupled to amplifier 100. For example, if the nominal deflection is increased from .002 inch to .004 inch, the resistance values of pots D3 and D4 are suitably increased so that when the actual stylus deflection reaches .004 inch (which would produce a relatively large error signal for a .002 inch nominal deflection) the output of amplifier 100 is zero.

Figure 3B:
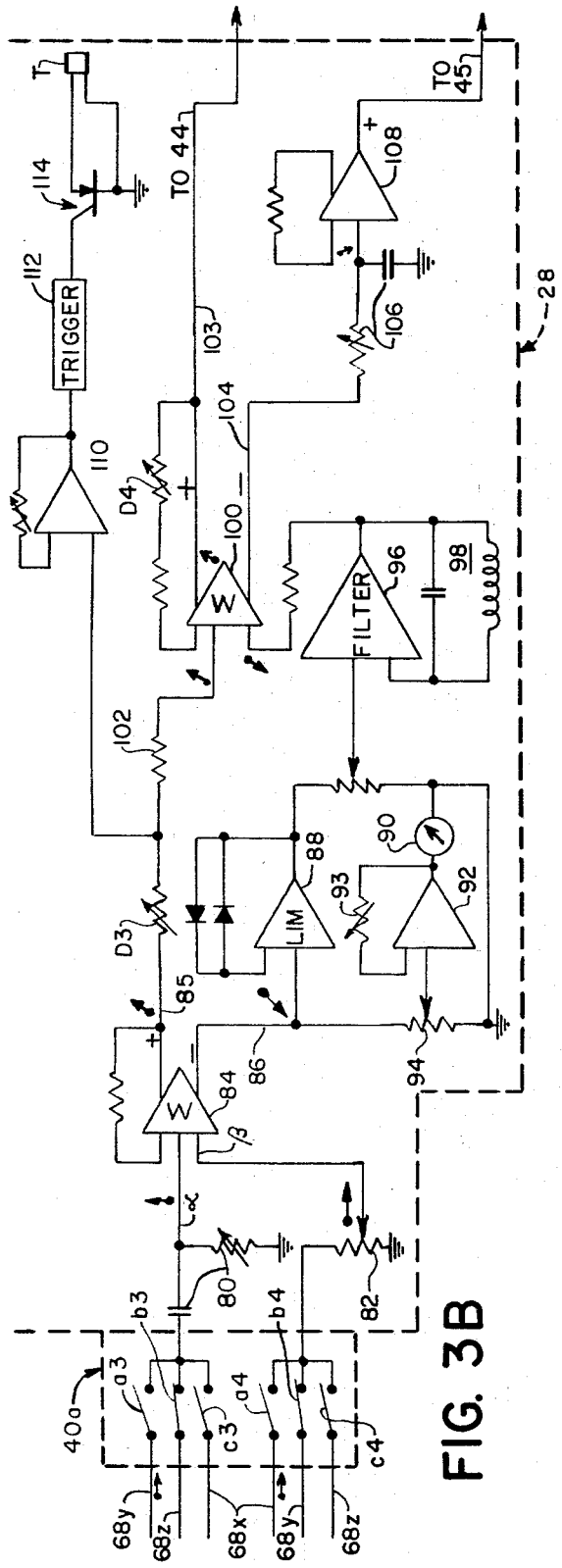
Figure 3E:
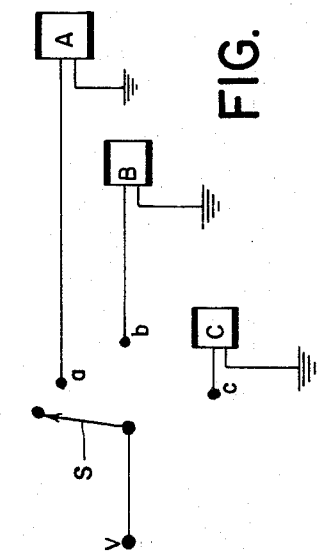

The voltage on line 103 is fed to the α phase demodulator 44 (FIG. 3D) which produces a direct voltage proportional to the actual error along the Z axis as represented on the output of summing amplifier 100 (FIG. 3B). The phase of the signal on line 104 is advanced ninety degrees by RC network 106, and then amplified by amplifier 108 so that the magnitude of the signal coupled to the β phase demodulator 45 is equal to the magnitude of the signal appearing on line 103. Hence, the output of the β phase demodulator 45, in the present example, will be a direct voltage equal to the position error of the stylus with respect to the Y axis.

The circuit operation is initiated when the total actual deflection exceeds a predetermined magnitude. For this purpose, the voltage at the junction of pot D3 and resistor 102 (FIG. 3B) is coupled through an amplifier 110 to a trigger device 112 which fires a silicon control rectifier 114 to energize a relay T when this predetermined voltage level is reached. By way of example, relay T may be energized when the actual deflection reaches approximately ninety percent of the desired nominal deflection. Relay T includes five movable contacts which are shown in their normally de-energized condition as contacts $t1$ to $t5$ in FIGURE 3C.

The velocity signals are derived in the same manner as that described above with reference to FIGURE 2. Seven sets of the relay contacts ($a3$, $b3$, $c3$—$a9$, $b9$, $c9$) are required to properly route the signals to the proper servos. Considering the illustrated example with reference to FIGURE 3C, line 68z is coupled via armature $b3$, relay contact $r1$, deflection pot D1, velocity pot V1, and armature $b8$ to one side of a resistance 116y from which the output is taken at 118y. Line 68y is connected through a path including armatures $b5$ and $b9$, relay contact $r3$, and pots D2 and V2 to a resistor 116z from which the output is taken at 118z. Relay contacts $t4$ and $t5$ normally short the output resistors 116 to ground, but when relay T is energized contacts $t4$ and $t5$ open permitting a voltage to appear across the respective output resistors.

The pick feed control (along the X axis in the illustrated case) is derived from the armature $b10$ which is coupled to a pulse generator 120. Generator 120 produces a single variable width pulse each time a limit switch 55 or 57 is actuated, and is fed from a voltage divider 122 coupled by armature 124 to either side of the reference voltage source. By adjusting the voltage divider 122, the magnitude of the generator output, and thus the speed at which pulse generator 120 steps the associated servo along the pick feed axis, may be varied; the pulse width controls the step size.

To initiate the circuit operation it is necessary that the stylus be moved into contact with the template. This may be accomplished manually in any of the three dimensions by operation of one or more of three switches each of which comprises a pair of ganged armatures 126 and 127 ($x$, $y$ and $z$) connected across resistors 128 and 130 on which appears, respectively, reference and out of phase voltages. Thus, movement of armature 126x upwardly applies the in-phase voltage across resistor 128 through armature 126x, normally closed relay contact $t1$, and resistor 117x to output line 118x. If the switch 127x is thrown downwardly, the out-of-phase reference across resistor 130 would be applied through armature 127x, relay contact $t1$, and 117x to the output line 118x in which case the servo would be driven in the opposite direction. In a similar fashion the switches 126y, 127y and 126z, 127z are capable of placing in-phase and out-of-phase control voltage on the respective output lines 118y and 118z.

In operation the user closes one of the switches (for example 126y) applying a voltage to line 118y to drive the servo so that the template approaches the stylus. When contact is made, the stylus begins to deflect and the voltage at the junction of pots D3 and resistor 102 rises until trigger 112 fires the silicon controlled rectifier 114 to energize relay T, thus opening the contacts $t1$, $t2$ and $t3$. When this occurs, manual control of the servos is no longer possible and the servos are responsive only to the error signals from the α and β phase demodulators 44 and 45 which are derived as explained above. Simultaneously, the opening of contacts $t4$ and $t5$ permits application of the velocity signals to the respective output lines 118x, 118y or 118z.

FIGURE 3D illustrates the output end of the system and is shown in schematic form since the illustrated components may be well known. Two more sets of contacts $a11$, $b11$, $c11$ and $a12$, $b12$, $c12$ of the relays A, B and C are necessary to route the signals from the α and β phase demodulators 44 and 45 to the proper servos. Each servo includes a pre-amplifier 132, an amplifier 134 and a motor 136 which may be an electric motor of the type manufactured by Yaskawa Electric Manufacturing Co. Ltd. (Japan) and sold under the mark "Minertia." Thus, with the relay armatures as shown the output of the α phase demodulator 44 is routed to the pre-amplifier 132y and the output of the β phase demodulator 45 routed to the preamplifier 132z. In the preferred embodiment of the invention, wherein electric motors are used, the back E.M.F. developed on the armature of the D.C. motor (as schematically indicated by line 138x) is fed back to the input pre-amplifier 132x to provide a reference for the servo. If desired, a conventional tachometer feedback could also be used.

The motors 136x, 136y, and 136z are D.C. motors with low inertia, high torque properties, and will cause rotation of their output shafts in either direction depending upon the polarity of the voltage applied thereto. The polarity of this voltage is determined primarily by the relative phase of the velocity signals which, it is recalled, are much larger than the position errors. It will be apparent to those skilled in the art that there are numerous ways in which the alternating voltages appearing on lines 118x, 118y and 118z may be used to produce the required bipolar control signal to suitably position the stylus and template. By way of example, the preamplifiers and/or amplifiers may include a full wave rectifier (not shown), the output of which controls the direct current flow through a conventional silicon controlled rectifier circuit.

It will be apparent to those skilled in the art that the specific pre-amplifiers and amplifiers will vary depending on the particular motors employed. It should also be obvious that the invention would also be applicable to standard hydraulic motors conventionally used for machine tool control.

The three dimensional scanning requires that after each tracing operation, the selected pick feed motor step the stylus along the pick feed axis, and tracing recommence in the reverse direction along the α and β axes. Thus, the limit switches 55 and (FIG. 2) are arranged so that when the stylus 14 has completed a tracing operation in the α, β plane, one of the two switches will be actuated. There are various ways in which this type of control could be achieved, and in the preferred embodiment the machine operator merely positions the switch actuators so that one of the two switches is actuated at the end of each tracing pass. For purposes of simplicity, only two limit switches are illustrated although in practice more will normally be employed.

Figure 3C:
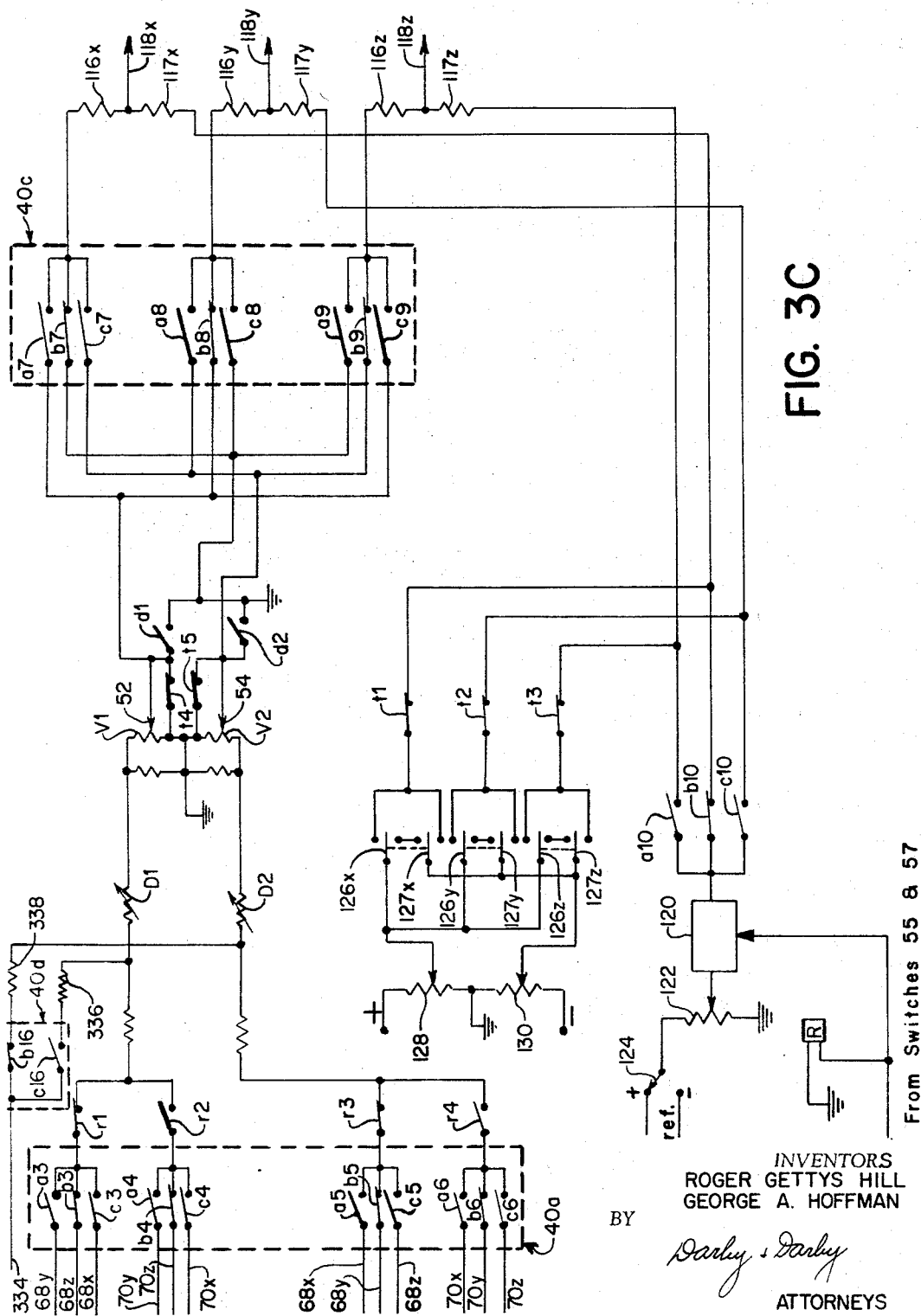

When either of the switches 55, 57 is actuated, a relay R is energized operating contacts $r1$, $r2$, $r3$ and $r4$ (FIG. 3C). This reverses the phase of the voltages applied to the deflection pots D1 and D2 and from which the velocity control signals on lines 118x, 118y and 118z are derived as explained above. Due to this phase reversal, the motors 136x, y or z, which are in the tracing axes, reverse their direction of rotation causing the stylus to trace backward with respect to the template in the α, β plane. When the stylus subsequently reaches the other limit switch, the template is again stepped along the pick feed axis and the direction of rotation of the motors again reversed so that the scanning can continue until the entire template has been covered. During the pick feed operation, a relay coil (not illustrated) may be energized to close contacts $d1$ and $d2$ (FIG. 3C) thereby shorting out the voltages across velocity pots V1 and V2, respectively.

From what has been said previously, it is apparent that the limit switches 55 and 57 must initiate the incremental movement along the pick feed axis. There are obviously numerous ways in which this could be accomplished. For example, when a limit switch is actuated, the output of the pulse generator 120 may be used to (1) brake the two selected tracing motors; (2) operate the pick feed motor after a predetermined interval and (3) brake the pick feed motor and release the two tracer motors after the desired incremental movement. In an obvious fashion, the various delays and the time of operation of the pick feed motor may be controlled whereby the stepping increments are variable over a considerable range.

For all intents and purposes the operation of the circuit is the same regardless of which axes are selected for the tracing axes and which is the pick feed axis. When relay A is energized tracing occurs in the X, Y plane, i.e. the X and Y axes become the $\alpha$ and $\beta$ coordinates, respectively, with the pick feed occurring along the Z axis. When relay C is actuated, the X and Z axes are used for tracing with the pick feed occurring along the Y axis. Although incremental movement along the pick feed axis is preferred, it is not always mandatory to the practice of the invention. For example, if the X, Y axes were selected as the 360 degree tracing axes, the invention could also be used to trace continuously along the Z axis at the same time in accordance with "single axis" or "single axis with slow down" tracing techniques. A variation of this nature would have utility in tracing a conical surface or the like.

A partial schematic diagram corresponding to the compensator 304 (FIG. 2) is illustrated at the bottom of FIGURE 3A. Continuing with the present example, the output $68x$ of the calibration module 24 is coupled through a closed relay contact $b13$ to a phase insensitive demodulator 324 which produces a direct voltage output of one polarity having a magnitude proportional to the input phase regardless of whether it is leading or lagging. The signal is then remodulated by a modulator 326 and coupled to an amplifier 328 having "positive" and "negative" outputs 330 and 332, respectively. The amplifier outputs are coupled through two more sets of relay contacts $b14$, $c14$ and $b15$, $c15$ and one of two reversing relay contacts $r5$ or $r6$ to output line 334 which, as explained below, is coupled to the velocity control circuits of FIGURE 3C.

The return to the calibration module 24 is derived directly from the output 330 of amplifier 328 which is connected through a resistor 335 to the slide wire of the Z axis null potentiometer 73 so that it appears as an input which is summed by amplifier $64z$. Thus, any deflection appearing on line $68x$ in the present example will be summed by amplifier $64z$ with the actual Z deflection applied thereto through emitter follower $62z$. As a practical matter the error involved in summing the magnitudes of the X and Z deflections (rather than the actual vectors) is sufficiently small to be ignored.

Since the velocity control must have a "positive" or "negative" phase depending upon the direction in which the apparatus is scanning, i.e. positive in one direction and negative in the other, the relay contacts $b14$, $c14$ and $b15$, $c15$ permit the proper phase to be applied through the relay contact $r5$ or $r6$ to line 334. It is recalled that energization of the respective limit switches 55 and 57, illustrated in FIGURE 2, causes actuation of contacts $r5$ and $r6$, whereby when a scanning operation is completed the position of the relay contacts are reversed, and the negative polarity on output line 332 coupled through contacts $b15$ and $r6$ to line 334. In substantially the same fashion when the X, Z axes are selected for tracing, the Y deflection signals from line $70y$ are appropriately coupled through one of contacts $c14$ or $c15$, and one of contacts $r5$ and $r6$, to the output line 334.

The velocity compensation is illustrated in detail in FIGURE 3C. At the upper lefthand corner, line 334 in the present example is coupled through a closed contact $b16$ and a resistor 338 to velocity pot V2 which is responsive to the Y deflection information and therefore used to control the Z velocity. If the tracing axes were the XZ axes, line 334 would be coupled through relay contact $c16$ to velocity pot V1 which would be the pot used to control the Z velocity.

In accordance with conventional practice, there is generally no necessity for compensating for Z axis deflection when tracing in the XY plane; therefore, no circuits have been shown for accomplishing this function although their use, should it ever be desirable for a related purpose, would be within the scope of the invention.

FIGURES 4 to 7 illustrate a novel and preferred embodiment of the three dimensional tracer head 15 which may be used with the invention. The head includes a cylindrical casing 200 secured to a hat shaped cover member 202 in a suitable fashion. Four radially arranged coil cores 204, 205, 206 and 207 are fixedly mounted within casing 200 to define a cylindrical central area. The cores 204 to 207 rest on annular ledge 208 and are held in place by four screws 210 passing through the ledge 208 and an upper annular core cover 212. Two coils $204a$ and $204b$ are wound around 204, with each of coils 205 to 207 including similarly labelled coils, i.e. $205a$, $205b$, etc. The coil leads are electrically connected to a conventional socket 209, suitably secured at the top of cover 202, which serves as a connector for all of the input and output voltages of the head.

Four adjustment screws 214 cooperate with respective cores 204, 205, 206 and 207 so that the physical positioning of the cores can be adjusted to provide a zero output for zero stylus deflection. Each of the adjustment screws 214 is covered by a button head screw 216 in the casing 200 for protection purposes.

A vertical pendulum 218 is disposed within the central area defined by the cores 204 to 207 and includes a small annular core 220 secured thereto in immediate proximity to the fixed cores 204, 205, 206 and 207. The threaded upper end 221 of pendulum 218 is screw into a lead weight 222.

A thin circular phosphor bronze diaphragm 230 is secured to the bottom of the casing 200 by four screws 232. A short upper holding arm 234 is screwed into the bottom of pendulum 218 immediately beneath diaphragm 230. A second hollow, elongated holder arm 236 is crimped into top holder 234 forming a "knee" 238 which in the event of excessive stylus pressure will collapse to avoid damage to the transducer and/or template.

The construction to this point is known. The coils $204a$, $204b$ and $206b$ (corresponding to the X axis) are connected to form a linear varaible differential transformer known as an LVDT. An LVDT produces a fixed frequency voltage, the amplitude of which varies linearly as a function of the position of core 220 with respect to the coil cores 204 and 206. The Y axis coils $205a$, $205b$ and $207a$, $207b$ are identically connected as an LVDT whereby the magnitudes of the output voltages are representative of the stylus deflection along the X and Y axes as discussed above. Arbitrarily, considering a deflection in one direction to produce a voltage at a reference phase, a deflection in the opposite direction will produce an output voltage which is 180° out of phase with the reference, but the amplitude of which is directly proportional to the magnitude of the deflection. Because of the pendulum effect, the voltage output is also dependent upon the stylus length.

According to the present invention, the head further includes transducer means for determining vertical deflection, i.e., deflection along the Z axis. This construction is shown clearly in FIGURES 5 and 7, and includes a coil construction 240 disposed toward the top of the holder arm 236. The leads of the coils 240 of an LVDT are applied to socket 209 through an L-shaped tunnel 241 in pendulum 218. A stylus holder 242 is inserted in the bottom of the elongated holder arm 236 and is adapted to rotate freely within the holder arm by bearing means (not shown) as the stylus contacts the template. The upper end 244 of the stylus holder 242 is threaded both internally and externally. An adjustment screw 246, received internally of the stylus holder portion 244, has an upper threaded end 248 which is received in an internally threaded Z axis core 250, and can be adjusted to locate the LVDT zero.

A coil spring 252 is located between the top of an annular collar 254 and a retaining ring 256.

The function of spring 252 is to bias core 250 into a neutral position within coil 240 by overcoming the force of gravity on the stylus components illustrated, and a spring adjuster 258 is provided to compensate for difference in spring constants between coil spring 252 and diaphragm 230. Spring adjuster 258 engages the external threads on the upper stylus holder portion 244, and includes a spiral groove 260 which receives one of the coils of the spring 252 such that the spring 252 pushes against the upper end of collar 254 urges the stylus construction (and the core 250) in an upward direction. If the stylus is brought against a surface in the XZ plane at an angle of 45° with the X axis, there should be an equal output from the Z transducer and the Y transducer. However, if the spring constant of the spring 252 in the Z axis transducer mechanism is not identical with the spring constant of the phosphor bronze diaphragm 230 used for the Y axis deflection, the mechanical deflection resulting from a 45° force would not be precisely equal in the Z and Y directions, but would favor that direction with a lower spring constant. Therefore, it is essential that the Z axis spring constant be adjusted to equal that of the diaphragm. By moving spring adjuster 258 up or down, in effect, the length of the spring 252, and therefore its spring constant, can be caused to match that of the diaphragm 230.

A conventional stylus 262 may be inserted into the bottom of the stylus holder 242 and held there by a set screw inserted through threaded aperture 264. The actual stylus 262 may be conventional and therefore is not shown here in detail. However, when a stylus is inserted into the holder 242, the additional weight of the stylus will necessarily displace the core 250 within coil 240. Hence, it is for this reason that the Z axis null potentiometer illustrated in FIGURE 3B is required.

In the case of the Z axis transducer the coil construction 240 preferably comprises an LVDT. However, the transducer here will only move upwardly from the reference point, and various other coil construction which will be obvious to those skilled in the art could be employed, as long as the output of the Z axis transducer varies linearly in amplitude as a function of Z axis displacement.

Although preferred embodiments of the various features of the different inventions have been shown and described, the invention is not so limited and many modifications will be obvious to those skilled in the art. The invention is not limited to any specific circuit, nor, of course, to any particular machine tool or the type of motors used for control. Accordingly, the invention should not be limited except as defined by the following claims.

What is claimed is:

1. A tracing device, comprising a transducer for producing first and second signals representative of respective components of stylus deflection from a template with respect to first and second axes, first means for moving said stylus with respect to said template along said first axis in response to, and at a speed corresponding to, said second signal, second means for moving said stylus with respect to said template along said second axis in response to, and at a speed corresponding to, said first signal, whereby said stylus is moved at a substantially constant velocity with respect to said template.

2. A tracing device, comprising transducer means for producing first and second transducer signals representative of stylus deflection from a template with respect to first and second axes, respectively, first means for moving said stylus with respect to said template along said first axis, second means for moving said stylus with respect to said template along said second axis, means responsive to said first and second transducer signals for determining the extent to which the total stylus deflection differs from a predetermined nominal level and, dependent upon such extent, for producing first and second error signals, means for coupling said first and second error signals to said first and second moving means, respectively, and velocity control means for coupling said first signal to said second moving means and said second signal to said first moving means, both said moving means cooperating to move said stylus at a substantially constant velocity with respect to said template and, at the same time, to maintain said error signals at a minimum level.

3. A tracing device according to claim 2, including means for changing said nominal level, and wherein said velocity control means includes means for maintaining its outputs to said first and second moving means substantially constant despite changes in said nomnal level.

4. A tracing device for use with a machine tool wherein means are provided for producing first and second alternating voltages, the amplitudes of which are representatives of the deflection of a stylus from a template with respect to X and Y axes, respectively, comprising X servo means for positioning said stylus with respect to said template along said X axis, Y servo means for positioning said stylus with respect to said template along said Y axis, summing means responsive to said first and second voltages for producing an alternating error voltage having an amplitude proportional to the extent to which the total stylus deflection differs from a predetermined nominal level, the phase of said error voltage being representative of the direction of said total stylus deflection, phase demodulator means for producing X and Y error signals proportional to the position error of said stylus with respect to said template along X and Y axes, respectively, means for coupling said X and Y error signals to said X and Y servos, respectively, and velocity control means for coupling said first signal to said Y servo and said second signal to said X servo to cause said stylus to be positioned to reduce said error signals to a minimum and at a substantially constant velocity, with respect to said template.

5. A tracing device according to claim 4, wherein said summing means includes first signal attenuation means for varying said predetermined nominal level, said velocity control means including additional signal attenuation means coupled to said first signal attenuation means for preventing changes in said velocity when said nominal level is changed.

6. A tracing device according to claim 5, including a meter coupled to said summing means for indicating the magnitude of said total stylus deflection.

7. A three dimensional tracing device comprising first, second and third transducers for producing respective voltages corresponding to the deflection of stylus means with respect to a three dimensional template along first, second and third mutually perpendicular axes;

first, second and third positioning means for positioning said stylus means with respect to said template along first, second and third axes, respectively;

two dimensional tracer means for continuously controlling two of said positioning means as a function of the outputs of their respective transducers;

pick feed means for incrementally stepping the other of said positioning means; and switch means (a) for selectively coupling any two of said transducers to said tracer means, (b) for connecting said tracer means to the two positioning means corresponding to said two transducers, and (c) for connecting said pick feed means to the positioning means corresponding to the other of said transducers.

8. A three dimensional tracing device, comprising X, Y and Z transducers for producing respective voltages corresponding to the deflection of a stylus with respect to a three dimensional template along X, Y and Z mutually perpendicular axes;

X, Y and Z servo means for positioning said stylus with respect to said template along said X, Y and Z axes, respectively;

two dimensional tracer means for continuously controlling two of said servo means as functions of the outputs of their associated transducers;

pick feed means for incrementally stepping the other of said servo means;

first switch means for selectively coupling any two of said transducers to said tracer means, the output of said tracer means to the servo means corresponding to said two transducers, and said pick feed means to the servo means corersponding to the other of said transducers; and second switch means responsive to the position of said stylus with respect to said template for initiating operation of said pick feed means and reversing the direction of rotation of the servo means corresponding to said two transducers thereby causing said stylus to scan said template.

9. A three dimensional tracing device according to claim 8, wherein said two dimensional tracing means includes means for deriving deflection signals with respect to the two selected tracer axes, and said first switch means is further operable to couple the output of the transducer associated with one of the selected tracer axes to the servo associated with the other selected tracer axis, and the output of the transducer associated with said other selected axis to the servo associated with said one selected axis.

10. A three dimensional tracing device according to claim 8, including means for compensating for changes in stylus length.

11. A method of controlling the movement of a tracer stylus with respect to a template, wherein said tracer stylus produces X and Y transducer signals representative of the direction of stylus nominal deflection along X and Y axes, and wherein X and Y motors move said stylus with respect to said template along said X and Y axes so that the total velocity remains substantially constant, comprising the steps of computing X and Y position signals as functions of said X and Y transducer signals, driving said X motor in response to said X position signal and said Y transducer signal, and driving said Y motor in response to said Y position signal and said X transducer signal.

12. Tracing apparatus for use with a machine tool which is adapted to be positioned with respect to a work piece along a path traced by a stylus with respect to a template, wherein first and second positioning means are provided to cause relative movement of said stylus and template along first and second axes, and wherein said stylus is connected to transducer means for producing first and second signals representative of stylus deflection from said template along said first and second axes, respectively, the improvement comprising;

means responsive to said first signal for deriving a signal adapted to control said second positioning means; and means responsive to said second signal for deriving a signal adapted to control said first positioning means.

13. A tracing device for tracing in at least two dimensions, comprising first and second transducer means for producing signals representative of components of stylus deflection from a template with respect to first and second axes, third transducer means for producing signals representative of stylus deflection with respect to a third axis perpendicular to said first and second axes, and means for combining the outputs of said third transducer means with the output of one of said first or second transducer means to produce a signal representative of the total stylus deflection from said template.

14. A tracing device, comprising a stylus adapted to be deflected from a template in a direction normal to the surface of said template, there being a preselected nominal deflection of said stylus in said normal direction, said stylus including transducer means for producing first, second and third signals representative of components of stylus deflection from said template with respect to three mutually perpendicular axes, means for selecting two of said axes as tracing axes and means for varying the output of one of the transducer means associated with said selected axes as a function of the output of said third transducer means.

15. Apparatus according to claim 14, including means responsive to said varying means for producing a signal adapted to change the tracing velocity of said stylus with respect to said template.

16. A three dimensional tracing device, comprising a stylus, X, Y and Z transducers for producing respective voltages corresponding to the deflection of said stylus from a template along X, Y and Z mutually perpendicular axes;

two dimensional tracer means responsive to two preselected transducers for producing first and second signals adapted to cause relative movement between said template and stylus along a path defined by said template in a plane defined by the axes corresponding to said preselected transducers; and means for combining the output of the transducer other than said preselected transducers with the outputs of said preselected transducers to produce a nominal deflection signal dependent upon the stylus deflection with respect to all three axes.

17. A three dimensional tracing device according to claim 16, including means responsive to the output of said combining means for producing a signal adapted to reduce the velocity of said stylus with respect to said template.

18. A three-dimensional tracing device wherein X, Y and Z transducers produce respective voltages corresponding to the deflection of a stylus from a template along X, X and Z axes, and wherein there is provided X, Y and Z means for positioning said stylus with respect to said template along said X, Y and Z axes, respectively, the improvement comprising:

two-dimensional tracer means for continuously controlling two preselected positioning means to cause said stylus to trace a path with respect to said template in a plane defined by the axes corresponding to said preselected positioning means, said two-dimensional tracer means including means for controlling the operation of each of said preselected positioning means as a function of the output of the transducer associated with the other of said preselected transducer means, means for producing a nominal stylus deflection signal as a function of the outputs of said preselected transducers, and means for maintaining said nominal deflection signal substantially constant; and means operable when said Z axis is one of said preselected axes for combining the output of said Z transducer with the output of the non-selected transducer so that the nominal deflection signal is a function of stylus deflection along all three axes.

19. A three-dimensional tracing device according to claim 17, including means responsive to stylus deflection along said non-selected axis for reducing the velocity of said stylus with respect to said template along the preselected axis other than said Z axis.

20. A tracing device according to claim 4, including signal attenuation means responsive to the output of said summing means for altering the output thereof as a function of stylus length.

21. A three dimensional tracing device according to claim 7, wherein said two-dimensional tracer means includes means for deriving deflection signals with respect to the two selected tracer axes, and said switch means is further operable to couple (d) the output of one of said two selected transducers to the positioning means associated with the other of said two selected transducers, and (e) the output of said other selected transducer to the positioning means associated with said one selected transducer.

22. A three-dimensional tracing device according to claim 21, including means operative at least when one preselected pair of transducers are coupled to said two-dimensional tracer means for varying the magnitude of the output of at least one of said pair of transducers as a function of the output of the transducer which is not coupled to said tracer means.

23. Tracing apparatus according to claim 12, including means coupled to the output of said transducer means for producing first and second error signals proportional to the extent to which said stylus deflection differs from a preselected level, said first and second error signals being adapted to control said first and second positioning means, respectively.

24. Tracing apparatus according to claim 12, including means responsive to said first and second signals for producing an alternating error voltage having an amplitude proportional to the extent to which said stylus deflection differs from a predetermined nominal level, the phase of said error voltage being representative of the direction of said total stylus deflection, and phase demodulator means for producing first and second error signals proportional to the position error of said stylus with respect to said template along said first and second axes, respectively, said first and second error signals being adapted to control said first and second positioning means, respectively.

25. A three-dimensional tracing device according to claim 16, including switch means for connecting any two of said transducers to said two-dimensional tracer means.

26. A three-dimensional tracing device according to claim 25, wherein said means for combining is operative when said Z transducer is one of said two preselected transducers.

27. A three-dimensional tracing device according to claim 18, including switch means for coupling the outputs of any two of said transducers to said two-dimensional tracer means.

28. A three-dimensional tracing device according to claim 27, including pick feed means, said switch means being operable to couple said pick feed means to the positioning means other than said two preselected positioning means.

References Cited by the Examiner

UNITED STATES PATENTS 3,121,370   2/1964   Larsen _____ 90—13.5

WILLIAM W. DYER, Jr., *Primary Examiner.*

G. A. DOST, *Assistant Examiner.*